United States Patent [19]

Babikian

[11] Patent Number: 4,843,992
[45] Date of Patent: Jul. 4, 1989

[54] AIR TUBE PROTECTED BY BELTS

[75] Inventor: Sarkis S. Babikian, Woolsey Station 31-02 23rd Ave., Long Island City, N.Y. 11105

[73] Assignee: Sarkis S. Babikian, Astoria, N.Y.

[21] Appl. No.: 70,821

[22] Filed: Jul. 2, 1987

[51] Int. Cl.$^4$ .................. B63B 43/12; B63B 43/14; B63B 7/08

[52] U.S. Cl. .................. 114/69; 114/123; 114/345; 114/360; 244/107; 441/41; 441/44

[58] Field of Search ............... 114/345, 123, 52–54, 114/68, 69, 360; 441/44–46, 41; 137/234.5, 454.5; 24/31 R, 31 L, 35, 90 R, 588, 629; 2/321; 244/17.11, 107, 121

[56] References Cited

U.S. PATENT DOCUMENTS

| | | | |
|---|---|---|---|
| 806,049 | 11/1905 | Bassett | 114/54 X |
| 2,498,685 | 2/1950 | Hyman | 2/321 |
| 2,892,434 | 6/1959 | Ralleo et al. | 114/54 |
| 2,930,397 | 3/1960 | Herman | 137/454.5 X |
| 2,940,700 | 6/1960 | Trannoy | 244/107 |
| 3,147,763 | 9/1964 | Morton | 137/234.5 |
| 3,367,340 | 2/1968 | David et al. | 24/588 X |

Primary Examiner—Sherman D. Basinger

[57] ABSTRACT

The cylindrical shape tube consists of a pressure valve and a safety valve. Whether the tube's contents be made of metal, expandable or non-stretchable materials, it has the ability to retain low air pressure. For safety purposes, any excess air pressure is released through the safety valve when the belts are made of metal content, the lengthwise belts have flares and grooves, the crosswise belts have oblong holes. When the belts are made of expandable or non-stretchable materials, snap head and grooves are cast within the lengthwise belts, the crosswise belts have round holes. The metal crosswise belts with their oblong holes can be engaged onto both the snap heads of the expandable lengthwise belts and flares of metal lengthwise belts. The expandable crosswise belts with their round holes can be snapped onto the snap heads of the expandable lengthwise belts and flares of the metal lengthwise belts. When a number of the completed air tubes protected by belts are interlocked, whether cross mannered or layered, it increases the potential of the lifting capacity for any load.

15 Claims, 7 Drawing Sheets

U.S. Patent  Jul. 4, 1989  Sheet 1 of 7  4,843,992
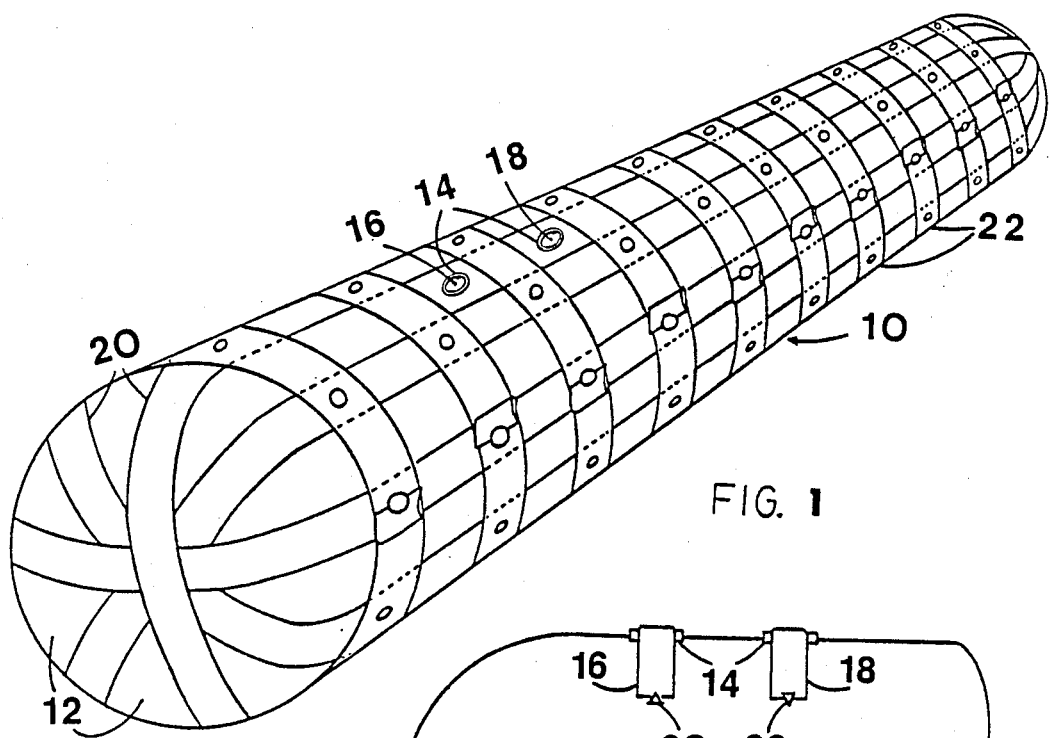
FIG. 1
FIG. 2
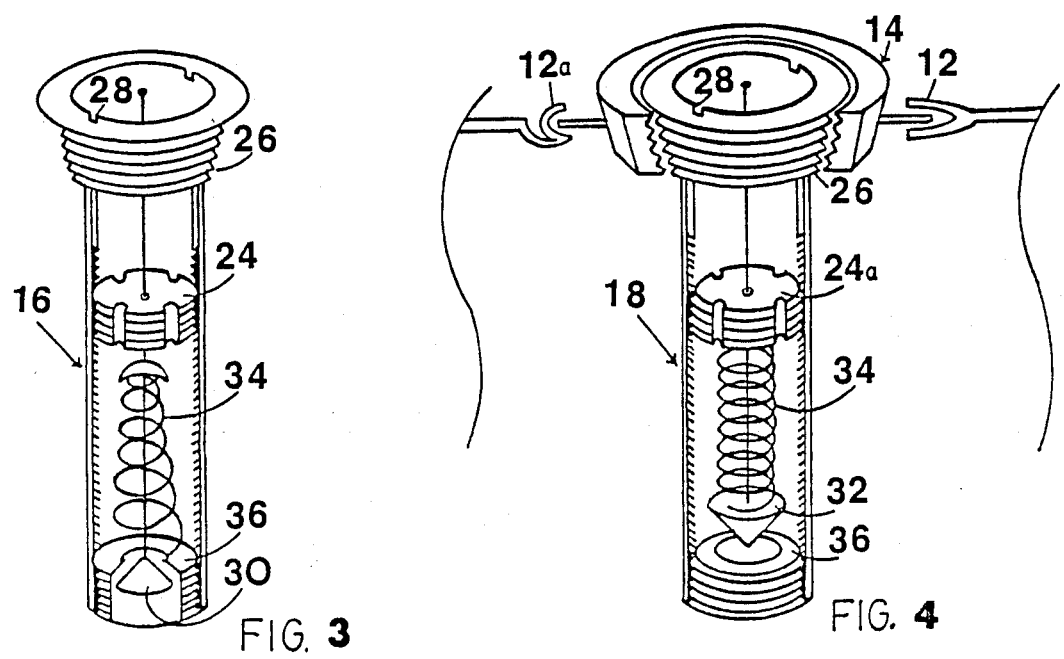
FIG. 3
FIG. 4

AIR TUBE PROTECTED BY BELTS

BACKGROUND OF THE INVENTION

This invention of Air Tubes Protected by Belts is to improve the safety of any floating objects, whereby weight, balance and buoyancy are factors.

Numerous inflatable devices have been disclosed in patents that are adapted for buoyancy in water. For example, U.S. Pat. Nos. 456,621; 1,960,474; 3,509,848; 4,517,914; 4,519,782; 4,597,355; plus 2,498,685; 2,892,434; 2,930,397; 3,147,763; 3,367,340; 2,940,700 and 806,049 all are illustrative of such prior art. While these units may be suitable for the particular porpose to which they address, they would not be as suitable for the purposes of the present invention as heretofore described.

SUMMARY OF THE INVENTION

The primary objective of the invention is to provide an Air Tube Protected by Belts that will overcome the limitations of the prior art devices. The invention is made in the shape of a cylindrical tube. It can be made of light metals or expandable materials. The tube is comprised of two valves screwed into threaded flanges; one an inlet valve and the other a safety valve. The inlet valve is used for pressurizing the tube while the safety valve is used to self release excess pressure of the cylinder.

When vesting the air tube, the lengthwise belts are placed first, followed by the crosswise belts. The belts can be made of metal or expandable materials. When fully vested, the air tubes become safety devices for any floating object.

When the longitudinal belts of endless shape length are made of metal, numerous flares with grooves are built within. The metal cross belts consist of oblong holes in order to engage onto the flare's grooves. The belts made on expandable materials differ in their engagement as the longitudinal belts of endless shape length are cast with protruding snap heads in order to snap into round holes in the cross belts. The circumference of the upper portion of the flare and the snap are identical in size as are the grooves. This gives the capability of the metal cross belts oblong holes to engage onto the snap heads of the expandable length belts. Also, the expandable belt's clip onto the flares of the metal length belts.

The purpose of this invention, of an Air Tube Protected by Belts is that, without further aid, it will prevent any floating object and its contents from sinking while offshore.

Further, the Air Tube Protected by Belts can be easily assembled or dismantled by any novice. Parts are also replaceable.

Another object to the invention is its attachability to an adjacent completed Air Tube Protected by Belts. To do this, one end of cross belts extend under an adjacent longitudinal belt and then is locked onto the flare or snap head of a longitudinal belt. The point of entry of any cross belt may begin from any fare or snap head position of the length belt.

An additional objective of the Air Tubes Protected by Belts is that it may be adapted to any ready built vessel, externally installed, without permanence, by the cross belts being locked onto boat hooks. No fittings on the hull are necessary.

Another objective of the invention is its versatility. When abreast, engaged and locked in a crosswise manner, the Air Tubes Protected by Belts will form a pontoon like shape to transport shapeless heavy loads offshore i.e. cranes, machinery, equipment, etc. Air tubes for these purposes are made with non-expandable materials.

Yet another objective is that the greater amount of tubes, interlocked together, whether cross mannered or layered, increases the potential of the lifting capacity for any load.

A further objective of the air Tubes Protected by Belts is the extra protection given, when used as a life raft, around a ready built helicopter. For example, in the event a pilot loses control of his helicopter, the Air Tubes Protected by Belts attached to the craft, would avoid loss of the vessel, crew and contents on impact with the water. Some of the air tubes, used as protector to the body of the craft, may become damaged on impact. The craft will retain its floating capability due to the individuality of each air tube which is protected by the belts.

To accomplish the above, this invention is embodied in the form of the accompanying drawings. These are some of the many examples of how this invention, using the Air Tubes Protected by Belts may be used. Its application and use are numerous.

BRIEF DESCRIPTION OF THE DRAWING FIGURES

FIG. 1 represents an Air Tube Protected by Belts.
FIG. 2 is a cylindrical shaped tube with two valves.
FIG. 3 is a sectionalized pressure valve.
FIG. 4 is a sectionalized safety valve.
FIG. 5 is a metal length-belt sectionalizing a flare.
FIG. 6 are two metal cross-belts engaged onto a length belt.
FIG. 7 is a metal cross-belt in its self-locked state.
FIG. 8 is a metal cross-belt in its endless circle with oblong holes.
FIG. 9 is a side view of the Air Tubes Protected by Belts using expandable materials.
FIG. 10 are several Air Tubes Protected by Belts, engaged one to the other.
FIG. 11 is an expandable length belt, sectionalized with the male portion of a snap fastener.
FIG. 12 are two expandable cross-belts, one in its unattached state, the other in a snap fastened position onto an expandable length belt.
FIG. 13 is an expandable cross-belt with a buckle.
FIG. 14 is an expandable cross-belt in its endless circular shape with round holes.
FIG. 15 shows that the Air Tubes Protected by Belts can be joined and locked together shaping a vessel.
FIG. 16 shows the Air Tubes Protected by Belts, joined in lengths and placed externally below the hull of a boat, secured by hooks cables, ropes, etc.
FIG. 17 shows the Air Tubes Protected by Belts on the inside of a boat in vertical form.
FIG. 18 shows the air Tubes Protected by Belts on the inside of a boat in horizontal form.
FIG. 19 shows the Air Tubes Protected by Belts engaged and locked, layered in a crosswise manner as a pontoon.
FIG. 20 shows a helicopter vested with Air Tubes Protected by Belts.

DETAILED DESCRIPTION OF THE PREFERRED EMBODIMENTS

Figure 5:
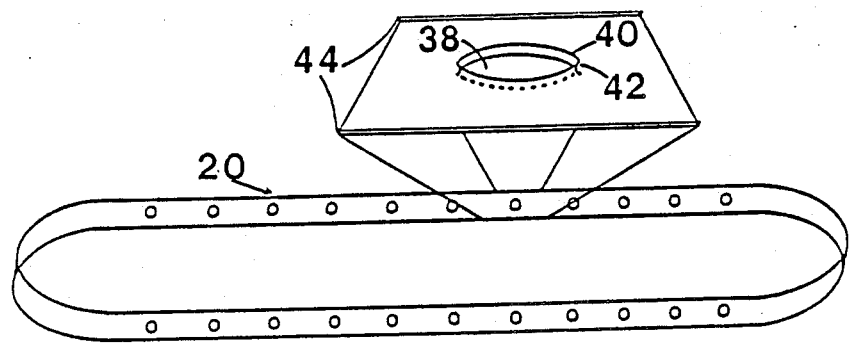

FIG. 1 is a plan of the Air Tube Protected by Belts represented by 10. A cylindrical shape tube 12, has cast on it, two threaded flanges 14. In the one threaded flange 14 is placed a pressure valve 16 while on the second threaded flange 14 is placed a safety valve 18. Metal belts 20 are vested lengthwise. Metal belts 22 are fastened crosswise.

The ensuing figures will further sectionalize the Air Tubes protected by Belts.

In FIG. 2 the cylindrical shaped tube 12 can be comprised of light metals i.e. aluminum, brass, copper, etc. or by the use of expandable materials. When the cylinders are made up of metal materials the two threaded flanges 14 are built onto the container. When the tube is made of expandable materials, then the two threaded flanges 14 are cast with the tube. The valves 16 and 18 are threaded into the flanges 14 and are protected because they are inside the tube 12. The pin locks are 30 and 32. As described in FIG. 4 the connection of a flange 14 with a metal tube as 12a and expandables made tube as 12b.

FIG. 3 shows a sectionalized pressure valve 16. The pin lock 30, under the orifice 36, is in an open position. The guide 24 acts as the stabilizer to the pin lock 30. The spring 34 contracts and the inner tube pressure helps to maintain the pin lock 30 in a closed position. The upper section of the valve 16 is threaded at 26. The groove 28 is used for screwing and unscrewing the pressure valve 16 for purposes of replacement.

FIG. 4 shows a sectionalized threaded safety valve 18, screwed at 26 unto the threaded flange 14 and slightly protruding from the tube 12 a referred to in FIG. 2. The threaded flange 14, grips 12a on the metal tube 12. When using expandable materials, the flange 14 is cast at 12b with the tube 12. The safety valve 18 shows the pin lock 32 above the orifice 36 and the spring 34 pressing to maintain the closed position. The threaded adjustable guide 24a presses the spring 34 onto the pin lock 32 to keep the desired pressure in the tube 12. The adjustable guide 24a also serves to stabilize the pin lock 32. The groove 28 is used for screwing and unscrewing the safety valve 18.

FIG. 4 shows a metal length belt 20, in endless form to be vested onto the tube lengthwise. The metal length-belt 20 is made with holes 38. The front and rear sections do not have these holes, as these areas will not be cross-belted. A sectionalized hole 38 of a portion of the metal length belt 20 is made to take the shape of the flare 40. The flare 40 has an outward curvature which transforms to a groove 42 located between the flare lip 40 and the surface of the metal length belt 20. The edges 44 of the metal length belt 20 are raised outwardly giving additional strength to the metal length belt 20.

Figure 6:
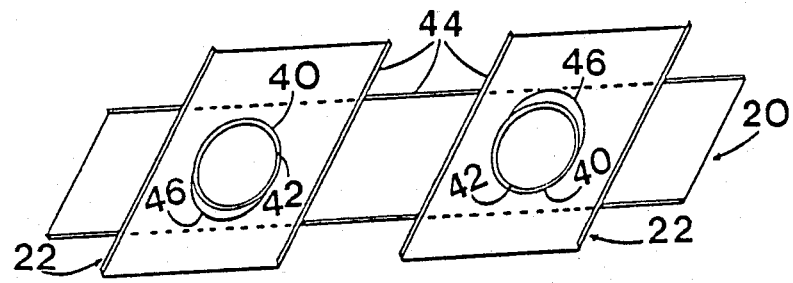

In FIG. 6 are two metal cross belts 22 engaged into a metal length belt 20. The metal cross belts 22 are made with oblong holes 46 to be engaged onto the flares 40 of the metal length belts 20 crosswise, limiting themselves to the grooves 42. Both belts have outwardly raised edges 44, giving additional strength to the belts 20 and 22. Each metal cross belt 22 is pulled in opposite directions to enable the metal cross belt 22 to be taut and movement is limited by the groove 42 of the metal length belt 20.

Figure 7:
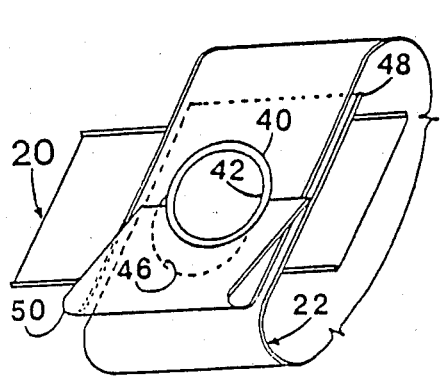

FIG. 7 shows the metal cross belt 22 in its self-locked state. The metal cross belt 22 indicates an initiated point 48 which is hooked to the longitudinal belt 20 flares 40 by sliding the oblong holes 46, limiting to the flare grooves 42, under the flare lip 40 of each metal length belt 20. The end of each metal cross belt 22 is turned over by folding into a reverse position to the opposite side of the oblong hole 46 as shown in the FIG. 7. The half moon appears as a left over from oblong hole 46. The metal cross belt 22 is pushed to the same initiated flare groove 42 forming a tight collar under the flare lip 40 thereby being in a self-locked position. The groove 42 has enough space for three layers of metal cross belts 22. The self-locking feature also enables joining of adjacent Air Tubes Protected by Belts, as FIG. 10 shows.

Figure 8:
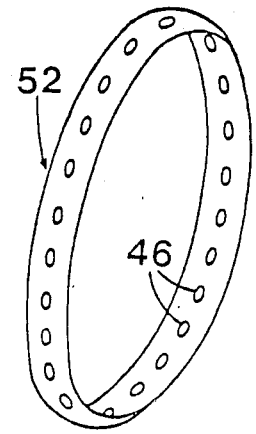

FIG. 8 shows an endless metal cross belt 52 with oblong holes 46. This endless feature is optional.

Figure 9:
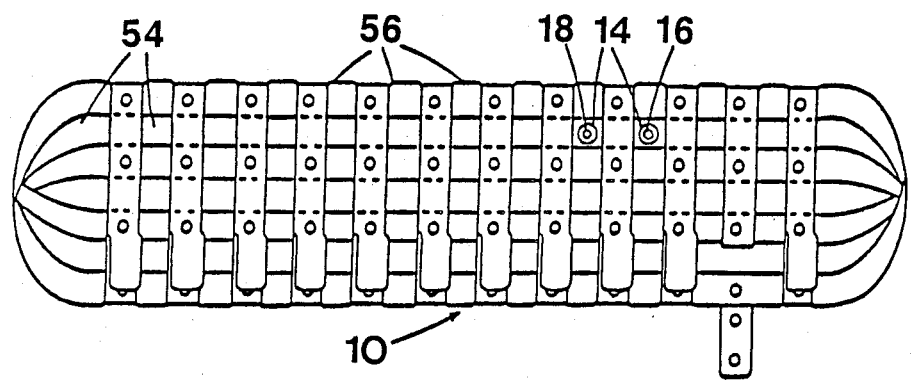

FIG. 9 shows a side view of an Air Tube Protected by Belts 10, with expandable materials, two threaded flanges 14, a pressure valve 16, a safety valve 18, and expandable air tube 54 which is pressurized. Between the belts, vested on the expandable air tube 54 are bulges 56 depicting squares. This unsymmetrical plane of the expandable air tube 54 is a beneficial defense to its safety in the event of a minor impact as it acts as a shock absorber. In greater impacts, the taut belts act as bumpers. An added safety feature to the expandable air tube 54 is the safety valve 18 as it releases air on great impact, lowering the tube pressure. The tube remains intact and then can be repumped.

Figure 10:
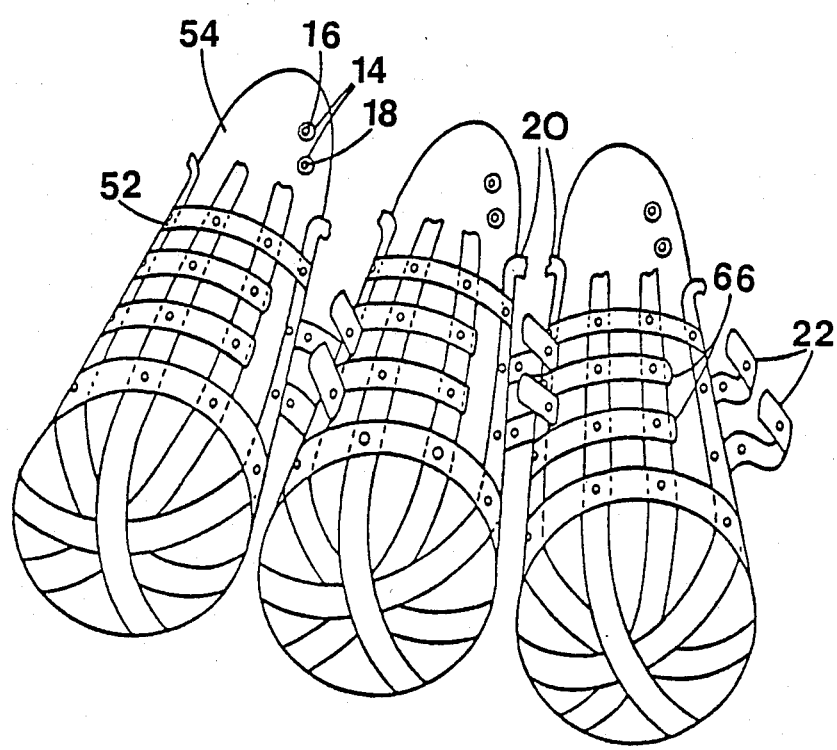

FIG. 10 is shown as a fully assembled Air Tube Protected by Belts 10 with the threaded flange 14, pressure valve 16 and the safety valve 18. The expandable cross belt 22 is initiated at 66 as detailed in FIG. 12. The cross belts 22 can be engaged whether they are made of expandable or metal materials. The cross belts 22 are extended to embrace length belts of an adjacent Air Tube Protected by Belts. The process can be repeated for as many Air Tubes Protected by Belts as the need requires. Endless cross belts 52 can be used as an option.

Figure 11:
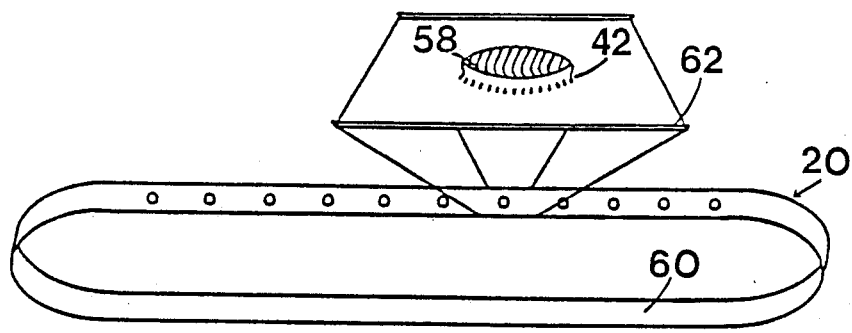

FIG. 11 shows an expandable length belt 20, in endless form, to be vested onto the tube lengthwise. The expandable length belt 20 is made with protruding snap heads 58 which are casted with the belt. The front and rear sections do not have these snap heads, as these areas will not be cross belted. The protruding snap heads, 58 are visible only on the surface of the expandable length belt 20. The reverse side 60 of expandable length belt 20 has no indentation and is flush. A sectionalized protruding snap head 58, of a portion of the expandable length belt 20, is shown. The protruding snap head 58 has grooves 42. The reinforced edges 62 are of a thickness to prevent stretching and to enable the belt to retain its shape.

Figure 12:
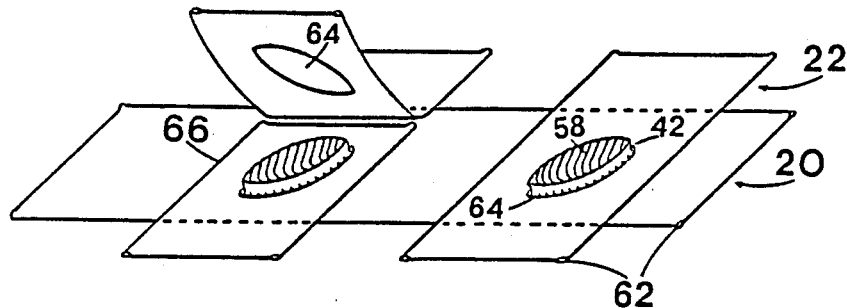

FIG. 12 shows two expandable cross belts 22 engaged onto expandable length belts 20. The expandable cross-belts 22 are made with round holes 64 to be engaged onto the protruding snap head 58 of the expandable length belts 20, crosswise, limiting themselves to the grooves 42. Both belts 20 and 22 have reinforced edged 62 of a thickness to prevent stretching and to enable them to retain their shapes. The round holes 64 of the expandable cross belts 22 are slightly smaller than the protruding snap head 58 so as to enable a tight fit. One end of the expandable cross-belt 22 is the starting point 66 from any protruding snap-head 58, of an expandable longitudinal belt 20. The other end of the expandable cross-belt 22 is fastened after making a perfect circle around the air tube and being snapped onto each longitudinal belt and clipped onto protruding snap-heads, for more security. The cross-belt is snapped by transpassing the first end and it is fastened to two or more snap heads. The groove 42 has enough space for three layers of the expandable cross belts 22. The self snapping fastener also has the ability to join with adjacent Air Tubes Protected by Belts in a manner as is shown in FIG. 10.

Figure 13:
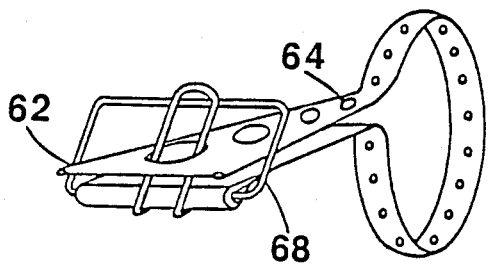

FIG. 13 shows an expandable cross-belt with a buckle 68, which is fastened by using its own round hole 64, having reinforced edges 62 of a thickness to prevent stretching and to enable it to retain its shape. The buckle 68 is optional as a fastener.

Figure 14:
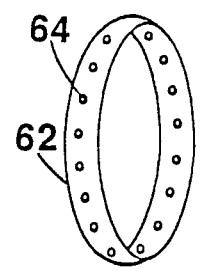

FIG. 14 is an expandable cross belt in its endless circular shape with round holes 64 and reinforced edges 62 of thickness to prevent stretching and to enable it to retain its shape. This expandable cross belt in its endless shape is optional.

Figure 15:
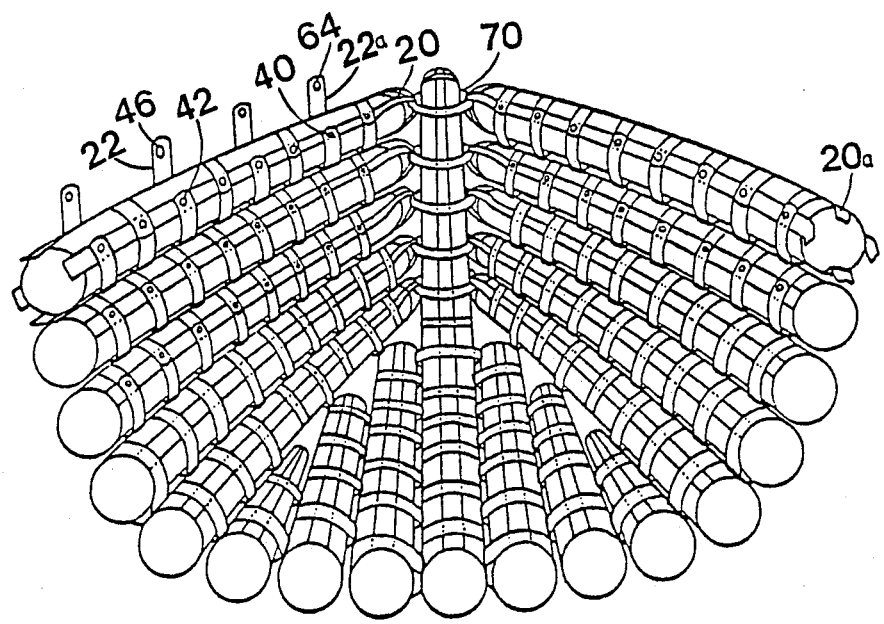

FIG. 15 shows that the Air Tubes Protected by Belts can be joined and locked together shaping a vessel. The metal length belts 20 with their flares 40, are vested around the air tube. The expandable cross belts 22a with its round holes 64, are clipped onto the flares 40, leaving the end loose to show that additional attachments can occur. The expandable length belts 20a with their protruding snaps are vested around the air tube. The metal cross belts 22 with its oblong holes 46, are engaged onto the snaps leaving the end loose to show that additional attachment can occur. FIG. 5 shows a sectionalized flare 40 with a groove 42 comprised of metal content. FIG. 11 shows a sectionalized protruding snap 58 with a groove 42 whose content is made of expandable materials. The circumference of the upper portion of the flare and snap are identical in size, as are the grooves. This gives the capability of the metal cross belts oblong holes to engage onto the snap heads of the expandable length belts. So too does the expandable cross belts round holes clip onto the flares of the metal length belts. Also shown, the cross belts 70 are engaged to the adjacent fully vested Air Tubes Protected by Belts passing under the length, and turned to its original circle then self-locked.

Figure 16:
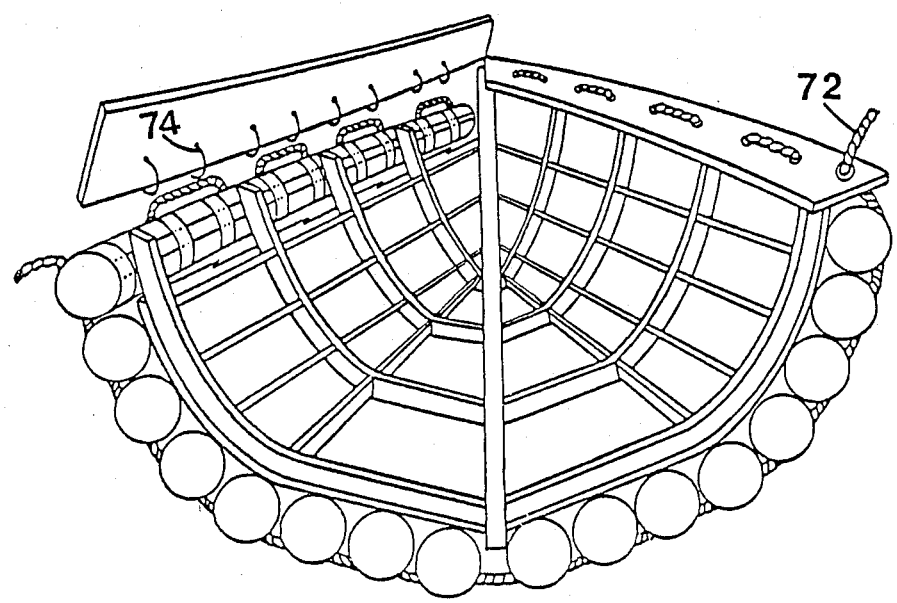

FIG. 16 shows a ready built boat vested with Air Tubes Protected by Belts which are laced with aluminum cable or rope 72 which are attached to hooks 74. The hull of a vessel without the protection of Air Tubes Protected by Belts does not have the ability to hold one volume of water without sinking. The boat vested with Air Tubes Protected by Belts gains the capability to support load weight plus water to be filled to its spill level without causing the vessel to sink. Using Air Tube Protected by Belts guarantees maximum floatation.

Figure 17:
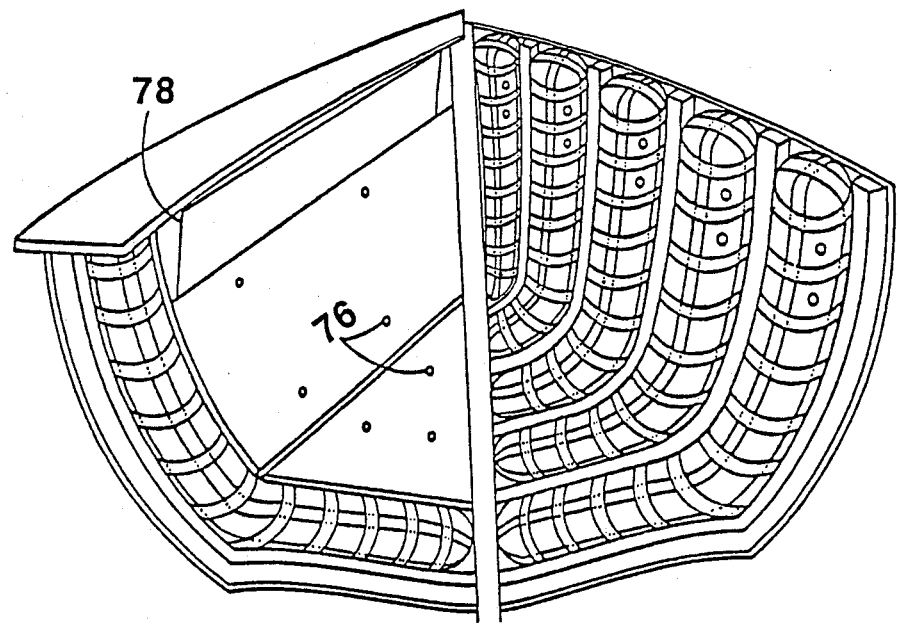

FIG. 17 shows a ready built boat. Placed inside are Air Tubes Protected by Belts placed in a vertical position and covered with panels fixed by screws 76 reaching the armature or the skeleton. For access to the Air Tubes Protected by Belts swingdoor 78 is provided. The area of the tubes with the panels covers approximately ten percent of the interior.

Figure 18:
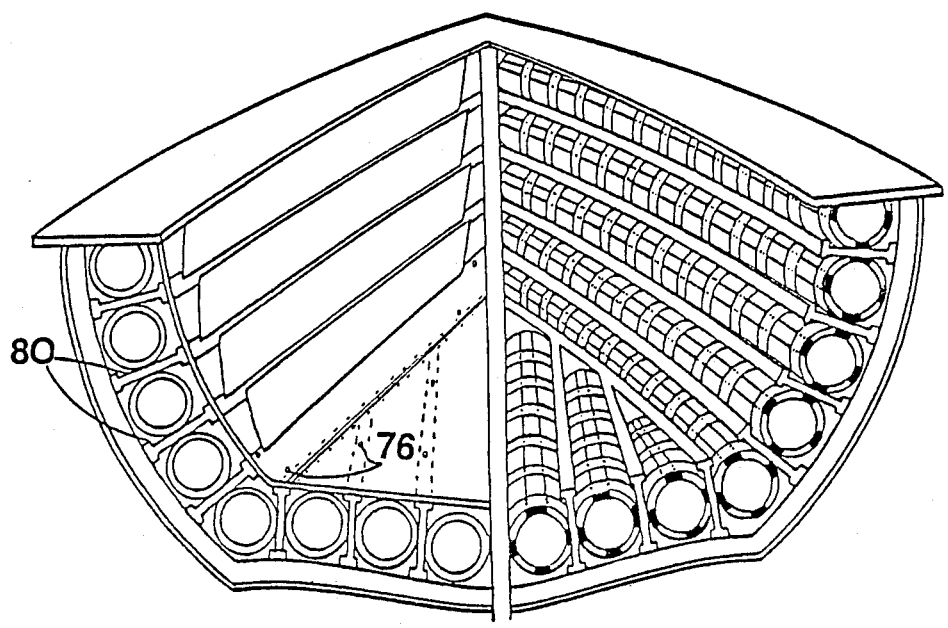

FIG. 18 shows a special made boat with Air Tubes Protected by Belts. A support 80 is placed to keep each Air Tubes Protected by Belts in an individual compartment for fast and easier access. Also the occupancy space of the tubes with the covers in inner area will not exceed over 10 percent.

Figure 19:
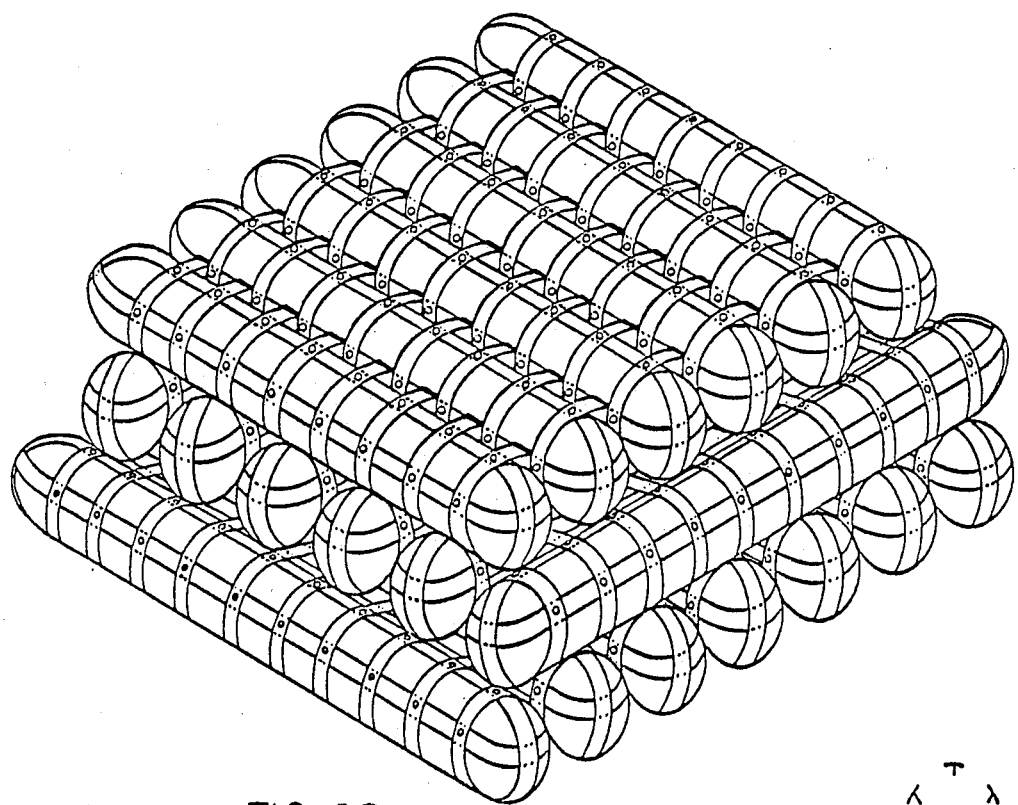

FIG. 19 shows the Air Tube Protected by Belts piled. The first row is abreast, and the second row is abreast crossways while the third row is crossways to the second row thus piling row crossways as much as the need requires. These tubes are made by rigid material to use as a pontoon to move heavy loads offshore.

Figure 20:
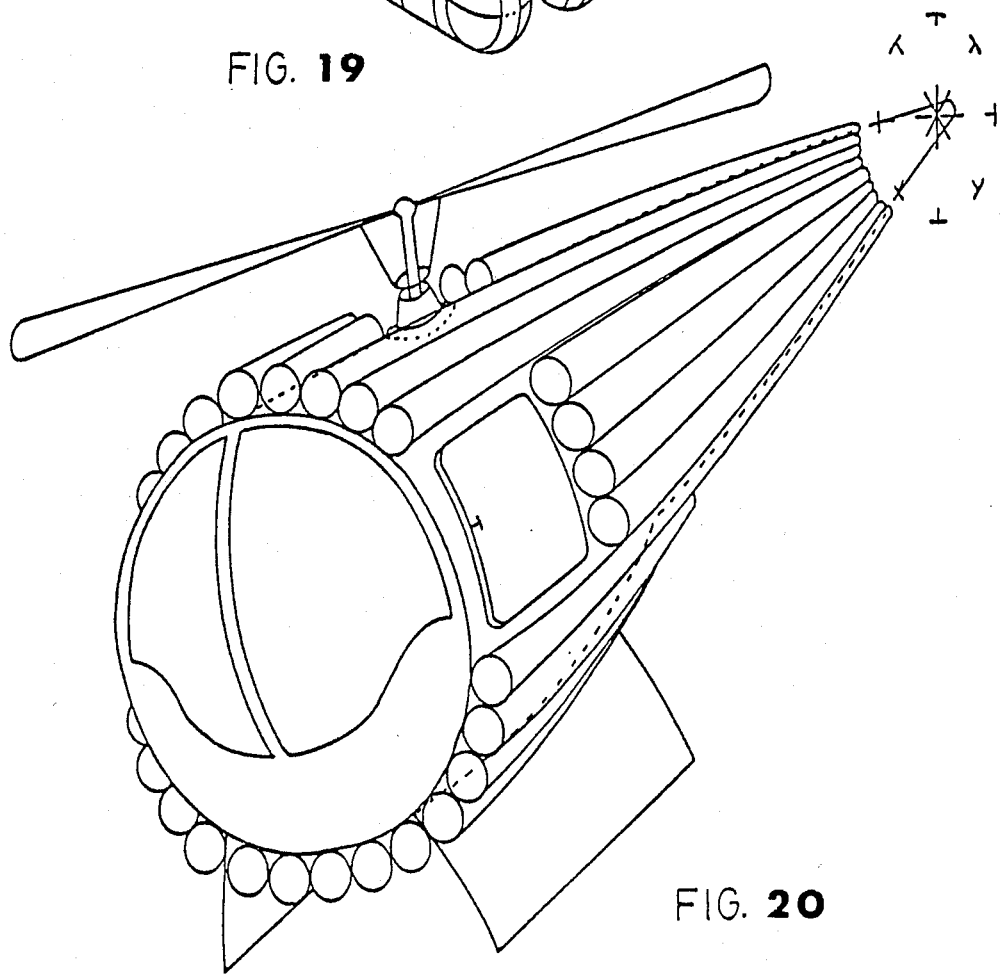

FIG. 20 shows a ready built helicopter vested with Air Tube Protected by Belts, as an alternative protection upon water impact. The tubes weight never exceed more than four percent from its total weight of a helicopter lifted on air with its cargo. When the tubes are placed internally they provide less quantity and less weight.

What is claimed is:

1. An air tube for improving the safety of a floating object, said air tube comprising: a substantially cylindrical tube having a lengthwise and a crosswise circumference and pressurized by a fluid, said tube having a presure valve for introducing said fluid into said tube, said tube also having a safety valve for relief of said pressure;

said tube further having a flange for said pressure valve and a flange for said safety valve, and said safety valve, said pressure valve, and each said flange being threaded such that said pressure valve and said safety valve can be threadedly engaged with its respective flange;

a first plurality of belts each extending around said crosswise circumference of said tube, a second plurality of belts each extending around said lengthwise circumference of said tube, one of said plurality of first or second belts having at least one grooved fastener, the other of said plurality of first or second belts having at least one aperture, said aperture receiving said grooved fastener to join said belts together such that said belts protect said air tube.

2. The air tube of claim 1 wherein said tube comprises metal.

3. The air tube of claim 1 wherein said tube comprises expandable material.

4. The air tube of claim 1 wherein said belts comprise metal.

5. The air tube of claim 1 wherein said belts comprise expandable material.

6. The air tube of claim 1 wherein said grooved fastener is a flared member and said aperture is oblong.

7. The air tube of claim 1 wherein said grooved fastener is a protruding snap and said aperture is round.

8. The air tube of claim 1 wherein belts from adjacent air tubes are interconnected such that a plurality of air tubes are joined together to form a vessel.

9. The air tube of claim 1 wherein said air tube is located within a floating vessel such that buoyancy of said vessel is increased.

10. The air tube of claim 1 wherein said air tube is attached to a helicopter such that upon crashing into water said helicopter has increased protection.

11. A plurality of belts for protecting a substantially cylindrical pressurized air tube, said air tube providing additional floatation to one of a watercraft, aircraft, or load being transported over water, said belts comprising:

at least one belt extending around said air tube longitudinally; at least one other belt for extending around said air tube crosswise of said at least one belt;

one of said belts having at least one fastener with a groove and a flared end forming said groove; the other of said belts having at least one aperture, said aperture receiving said grooved fastener so as to join said belts together after they have been placed around said air tube; and wherein one of said belts is passed under one of said belts of an adjacent air tube so as to join together two of said air tubes.

12. The belts of claim 11 wherein said belts comprise metal.

13. The belts of claim 11 wherein said belts comprise expandable material.

14. The belts of claim 11 wherein said aperture is oblong.

15. The belts of claim 11 wherein said aperture is round.

* * * * *